(12) United States Patent
Hayashi

(10) Patent No.: US 8,444,277 B2
(45) Date of Patent: May 21, 2013

(54) PROJECTOR HAVING LIGHT BLOCKING MEMBERS SUPPORTED BY CORRESPONDING SUPPORTING SECTIONS

(75) Inventor: Daisuke Hayashi, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 321 days.

(21) Appl. No.: 12/900,749

(22) Filed: Oct. 8, 2010

(65) Prior Publication Data

US 2011/0085145 A1 Apr. 14, 2011

(30) Foreign Application Priority Data

Oct. 13, 2009 (JP) .................................. 2009-236004

(51) Int. Cl.
*G03B 21/14* (2006.01)
*G03B 21/22* (2006.01)
*G02B 9/08* (2006.01)

(52) U.S. Cl.
USPC ................... 353/97; 353/38; 353/88; 353/75; 359/739; 359/740

(58) Field of Classification Search
USPC ... 353/38, 97, 88, 75; 359/739, 740; 369/118; 355/71
See application file for complete search history.

(56) References Cited

U.S. PATENT DOCUMENTS

| 7,055,966 | B2 * | 6/2006 | Momose et al. | 353/97 |
| 7,182,470 | B2 * | 2/2007 | Hashimoto et al. | 353/97 |
| 7,185,990 | B2 * | 3/2007 | Koga et al. | 353/97 |
| 8,162,488 | B2 * | 4/2012 | Yamada et al. | 353/97 |
| 8,262,233 | B2 * | 9/2012 | Mochizuki | 353/97 |
| 2005/0219474 | A1 * | 10/2005 | Hara et al. | 353/88 |
| 2007/0035702 | A1 * | 2/2007 | Shimizu et al. | 353/34 |
| 2009/0174869 | A1 * | 7/2009 | Inui et al. | 353/91 |

FOREIGN PATENT DOCUMENTS

JP 2007-071913 A 3/2007

\* cited by examiner

*Primary Examiner* — Georgia Y Epps
*Assistant Examiner* — Magda Cruz
(74) *Attorney, Agent, or Firm* — ALG Intellectual Property, LLC

(57) ABSTRACT

A projector includes: first and second light blocking members adapted to partially block a light beam from a light source, and a drive section adapted to make the first and second light blocking members perform an opening and closing operation. When the corresponding first and second light blocking members are located at a maximum blocking state, with respect to an opening and closing direction of the first and second light blocking members perpendicular to a system optical axis, a first and second support sections support the first and second light blocking members at predetermined positions on the system optical axis side from intermediate positions corresponding to midpoints of areas between edge portions of the first and second light blocking members on the system optical axis side and parts, to which outer edges of the light beam to be blocked are input.

10 Claims, 8 Drawing Sheets

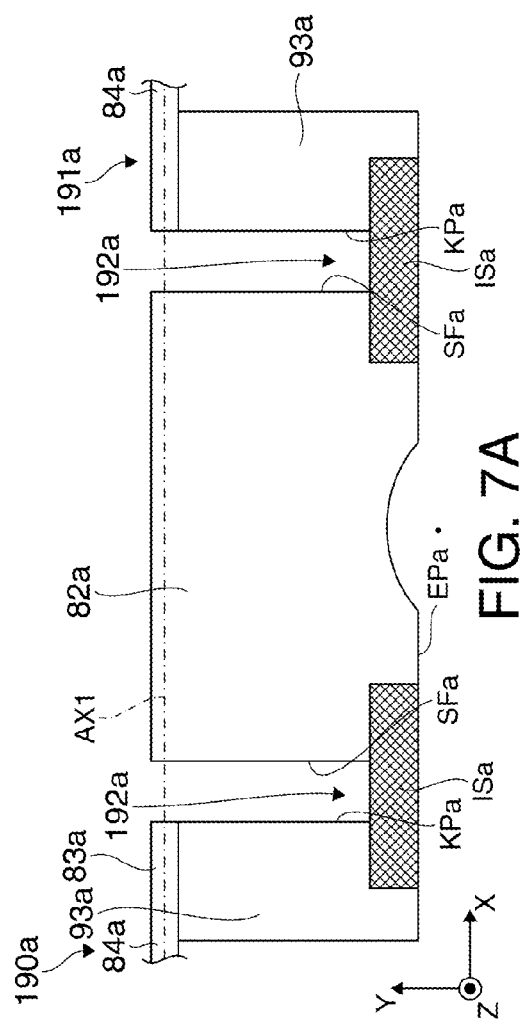
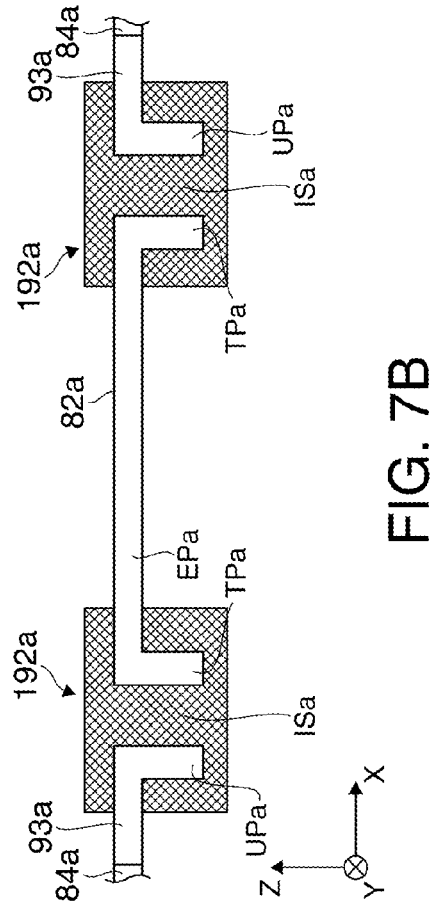
FIG. 7A
FIG. 7B
FIG. 7C
FIG. 7D

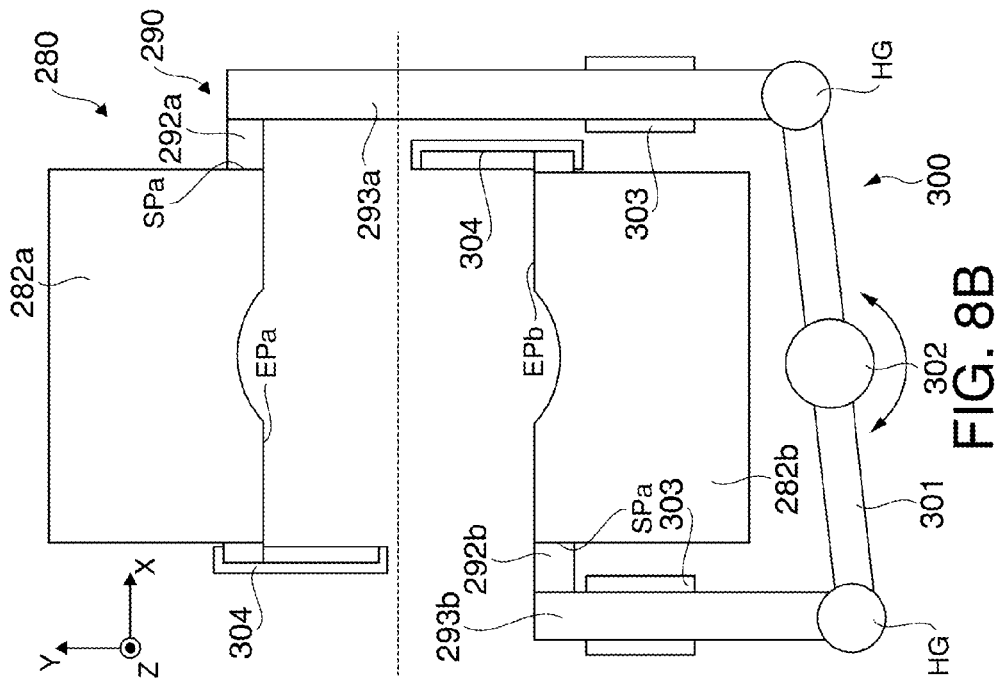
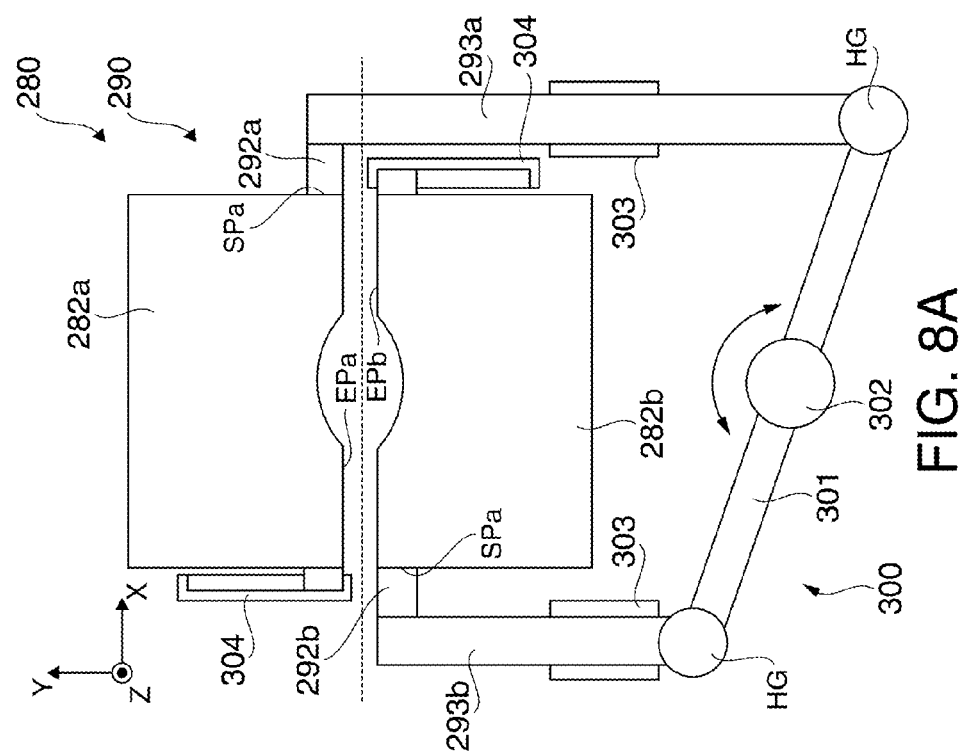

PROJECTOR HAVING LIGHT BLOCKING MEMBERS SUPPORTED BY CORRESPONDING SUPPORTING SECTIONS

BACKGROUND

1. Technical Field

The present invention relates to a projector provided with a light blocking member for controlling an amount of illumination light.

2. Related Art

As a projector using a light blocking member, there is known a projector having a pair of light blocking members, which can be opened and closed by rotation, disposed between a pair of lens arrays in a illumination device so as to be symmetrical about the illumination light axis, thereby controlling an amount of blocking of the illumination light (see, e.g., JP-A-2007-71913). In such a projector, both of the extension lines of a pair of rotational shafts (rotational support shafts) for rotatably supporting a pair light blocking members pass through the outside of the light path of the illumination light, and the tips of the pair of light blocking members are located on the side opposite to the side of the extension lines of the rotational shafts, namely the side of the center of the illumination light beam. Since the tips of the light blocking members move closer to and away from each other across the light axis of the illumination light by rotating the tips of the pair of light blocking members around the rotational shafts, the amount of blocking of the illumination light can be controlled (see the document mentioned above).

However, according to the light blocking members having the structure described above, since the closer to the tips of the light blocking members a portion thereof is located, the closer to the center of the illumination light the portion is located, the closer to the tips of the light blocking members the portion thereof is located, the more heat the portion absorbs. Therefore, since the light blocking members are apt to expand toward the tips thereof, and an amount of gap in the maximum blocking state of the illumination light is reduced with heating, accuracy in controlling the amount of blocking of the illumination light is lacking, and therefore, a variation might be caused in the dynamic contrast ratio.

SUMMARY

An advantage of some aspects of the invention is to provide a projector capable of reducing the influence of the heat caused by the illumination light blocked on the light blocking member to thereby accurately control the amount of light blocking, and thereby suppressing the variation in dynamic contrast ratio.

A projector according to an aspect of the invention includes an illumination optical system including a light source, first and second light blocking members adapted to partially block a light beam from the light source, and a drive section adapted to make the first and second light blocking members perform an opening and closing operation, a light modulation device illuminated by an illumination light from the illumination optical system, and a projection optical system adapted to project the light beam modulated through the light modulation device, wherein the drive section includes first and second support sections adapted to respectively support the first and second light blocking members, and when the corresponding first and second light blocking members are located at a maximum blocking state, with respect to an opening and closing direction of the first and second light blocking members perpendicular to a system optical axis, the first and second support sections support the first and second light blocking members at predetermined positions on the system optical axis side from intermediate positions corresponding to midpoints of areas between edge portions of the first and second light blocking members on the system optical axis side and parts, to which outer edges of the light beam to be blocked are input.

According to the projector described above, since the first and second support sections support the first and second light blocking members at predetermined positions on the system optical axis side from the intermediate position described above, even if the entire first and second light blocking members expand by heating, the thermal variation of the positions on the tips of the light blocking members can be prevented in the blocking state. Thus, the projector described above makes it possible to more accurately control the amount of light blocking, and can reduce the variation in the dynamic contrast ratio.

Further, according to a specific embodiment or aspect of the invention, with respect to the opening and closing direction of the first and second light blocking members, edge portions of the first and second light blocking members on a side further from the system optical axis are opened. In this case, in the expansion due to the heating, the edge portions on the side further from the system optical axis are apt to be displaced.

Further, according to another aspect of the invention, the first and second support sections support the first and second light blocking members at side positions of the edge portions on the system optical axis side. In this case, it becomes possible to surely prevent the unwanted thermal displacement of the edge portions on the system optical axis side due to the thermal expansion or the thermal contraction of the first and second light blocking members.

Further, according to still another aspect of the invention, the drive section includes rotational support shafts adapted to rotate the first and second light blocking members via the first and second support sections to thereby make the first and second light blocking members perform an opening and closing operation. In this case by opening and closing the first and second light blocking members in manner of a double door, it becomes possible to easily perform wide range multistage or continuous control of the amount of light.

Further, according to yet another aspect of the invention, the drive section includes first and second arm sections coupled to the first and second light blocking members via the first and second support sections to thereby transmit power, respectively. In this case, it becomes possible to support the light blocking members on the tip side of the arm section. In this case, by adjusting the sizes of the first and second support sections, it becomes possible to reduce the heat conduction to the first and second arm sections to thereby reduce the expansion of the first and second arm sections.

Further, according to still yet another aspect of the invention, the first and second support sections include coupling sections each made of a heat insulating material, and disposed between the first and second light blocking members and the first and second arm sections, respectively. In this case, by using the heat insulating member, it becomes possible to reduce heat conduction to the first and second arm sections.

Further, according to further another aspect of the invention, the first and second light blocking members are disposed symmetrically about the system optical axis as an axis of symmetry as a pair of light blocking members, and the drive section drives the pair of light blocking members in sync with each other. In this case, the light blocking can be performed in the condition of keeping symmetric property with respect to the system optical axis.

Further, according to still further another aspect of the invention, the illumination optical system includes first and second lens arrays adapted to equalize the light beam from the light source, and an overlapping lens adapted to overlap the illumination light having passed through the first and second lens arrays, and the first and second light blocking members are disposed between the first lens array and the overlapping lens. In this case, it becomes possible to block the light beam after being split by the first lens array and before being overlapped, and it becomes possible to prevent an influence of the light amount control on the evenness of the illumination.

BRIEF DESCRIPTION OF THE DRAWINGS

The invention will be described with reference to the accompanying drawings, wherein like numbers reference like elements.

FIGS. 7A through 7D are schematic diagrams for explaining a structure according to another modified example of the structure of the pair of light blocking members.

FIGS. 8A and 8B are schematic diagrams showing an example of the structure of the pair of light blocking members in a projector according to a second embodiment.

DESCRIPTION OF EXEMPLARY EMBODIMENTS

First Embodiment

Hereinafter, a projector according to a first embodiment of the invention will be explained with reference to FIG. 1 and so on.

Figure 1:
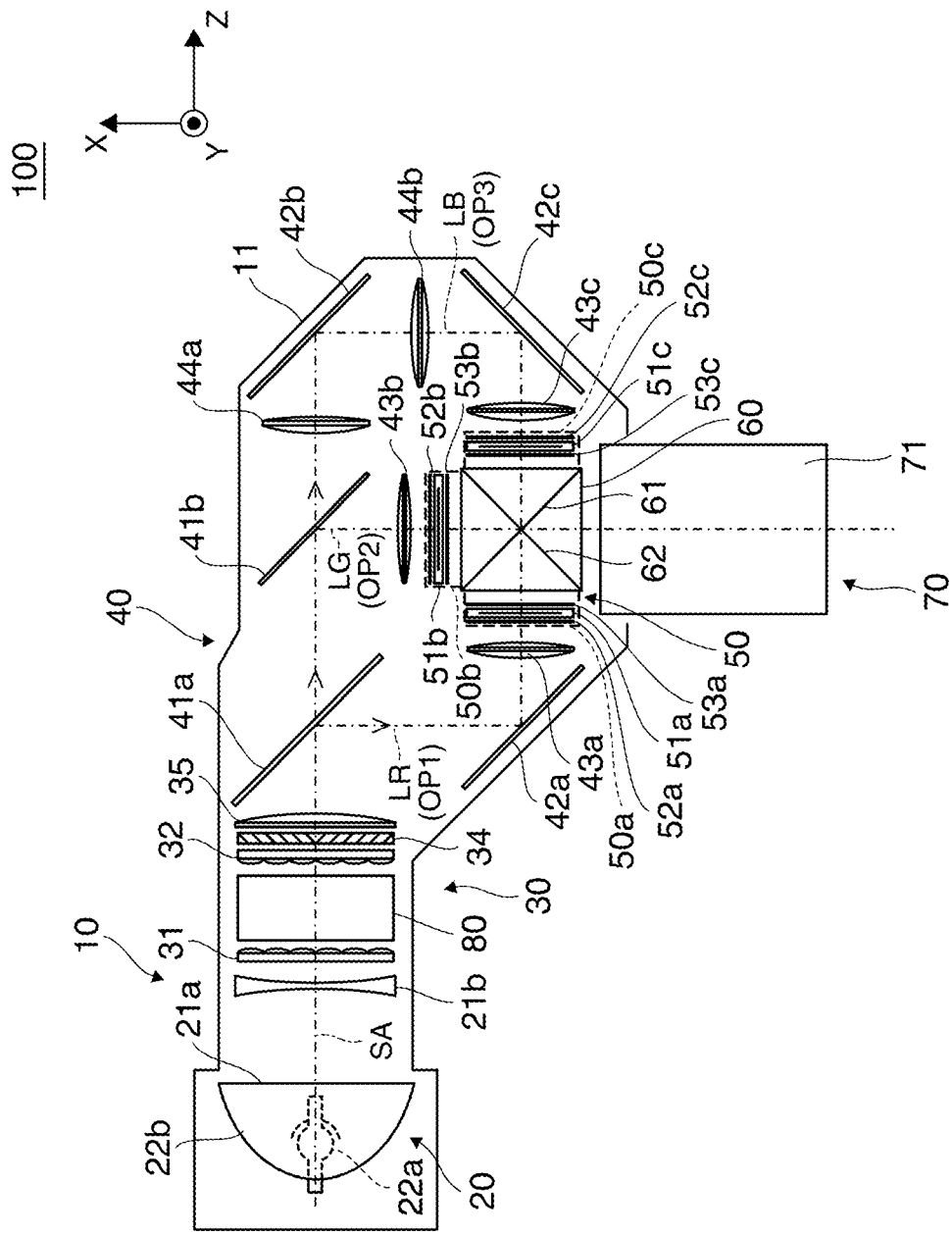
FIG. 1 is a plan view conceptually showing a projector according to a first embodiment.

As shown in FIG. 1, the projector 100 according to the present embodiment is provided with an illumination device 10, a color separation light guide optical system 40, a light modulation section 50, a cross dichroic prism 60, and a projection optical system 70, and among these components, the illumination device 10 is an illumination optical system including a light source lamp unit 20, an equalizing optical system 30, and a light control device 80.

The optical units constituting the projector 100, namely the illumination device 10, the color separation light guide optical system 40, the light modulation section 50, the cross dichroic prism 60, and the projection optical system 70 are almost entirely housed in a case member 11 as a light guide provided with a light blocking property. Further, these optical units or the constituents thereof are assembled to holding sections (not shown) disposed on the inner surface of the case member 11 in an aligned manner.

Among the constituents of the illumination device 10, the light source lamp unit 20 is provided with a lamp section 21a and a concave lens 21b as a light source. Among these components, the lamp section 21a is provided with a light emitting tube 22a such as a high-pressure mercury lamp, and an elliptical concave mirror 22b for reflecting the light beam emitted from the light emitting tube 22a and emitting it frontward. The concave lens 21b, which has a role of converting the light beam from the lamp section 21a into a light beam substantially parallel to a system light axis SA, namely the illumination light axis, can also be eliminated in the case in which, for example, the concave mirror 22b is a paraboloidal mirror.

The equalizing optical system 30 is provided with first and second lens arrays 31, 32, a polarization conversion member 34, and an overlapping lens 35. The first and second lens arrays 31, 32 are each a fly-eye lens composed of, for example, a plurality of element lenses arranged in a matrix. The element lenses constituting the first lens array 31 among these lens arrays split the light beam emitted from the light source lamp unit 20 into a plurality of partial light beams. Further, the element lenses constituting the second lens array 32 emit the respective partial light beams from the first lens array 31 with appropriate divergence angles. The polarization conversion member 34 is formed of, for example, a prism array of PBSs, and converts the light beam emitted from the lens array 32 into a light beam including only a linearly polarized light with a specific direction, and supplies it to an optical system of a successive stage. The overlapping lens 35 appropriately collects the illumination light, which is emitted from the second lens array 32 and passes through the polarization conversion member 34, as a whole, thereby making it possible to illuminate the liquid crystal light valves 50a, 50b, and 50c of the respective colors provided to the light modulation section 50 in an overlapping manner.

The light control device 80 is disposed between, for example, the first lens array 31 and the second lens array 32, and controls an amount illumination light emitted from the illumination device 10 by opening and closing a pair of light blocking member in manner of a double door. It should be noted that the specific configuration of the light control device 80 will be described later with reference to FIG. 2 and so on.

The color separation light guide optical system 40 is provided with first and second dichroic mirrors 41a, 41b, reflecting mirrors 42a, 42b, and 42c, and three field lenses 43a, 43b, and 43c, and separates the illuminating light emitted from the light source lamp unit 20 into three colors of red (R), green (G), and blue (B), and at the same time, guides the respective colored light beams to the liquid crystal light valves 50a, 50b, and 50c at the posterior stage. In more detailed explanation, firstly the first dichroic mirror 41a reflects an illumination light beam LR of an R color among the three colors of RGB, and transmits an illumination light beams LG, LB of G and B colors. Further, the second dichroic mirror 41b reflects the illumination light beam LG of the G color out of the two colors of GB, and transmits the illumination light beam LB of the B color. In other words, the red light beam LR reflected by the first dichroic mirror 41a is guided to a first optical path OP1 on which the field lens 43a is located, the green light beam LG transmitted through the first dichroic mirror 41a and then reflected by the second dichroic mirror 41b is guided to a second optical path OP2 on which the field lens 43b is located, and the blue light beam LB transmitted through the second dichroic mirror 41b is guided to a third optical path OP3 on which the field lens 43c is located. The field lenses 43a, 43b, and 43c for the respective colors control the incident angles of the partial light beams emitted from the second lens array 32 and then entering the light modulation section 50 after being transmitted through the overlapping lens 35 so that the partial light beams have an appropriate degree of convergence or divergence with respect to the system optical axis SA on the illuminated areas of the respective liquid crystal light valves 50a, 50b, and 50c. A pair of relay lenses 44a, 44b are disposed on a third optical path OP3 relatively longer than the first optical path OP1 and the second optical path OP2, and transmit the image formed immediately before the first relay lens 44a on the entrance side to the field lens 43c on the exit side without no substantial modifications, thereby preventing degradation in use efficiency of the light beam due to scattering of the light beam.

The light modulation section 50 is provided with the three liquid crystal light valves 50a, 50b, and 50c which the three illumination light beams LR, LG, and LB enter respectively. The liquid crystal light valves 50a, 50b, and 50c are provided with liquid crystal panels 51a, 51b, and 51c disposed at the center thereof, entrance side polarization filters 52a, 52b, and 52c on one side, namely on the upstream of the light path, and exit side polarization filters 53a, 53b, and 53c on the other side, namely on the downstream of the light path, disposed so as to sandwich the liquid crystal panels, respectively. The colored light beams LR, LG, and LB respectively entering the liquid crystal light valves 50a, 50b, and 50c are intensity-modulated pixel-by-pixel in accordance with drive signals or control signals input to the respective liquid crystal light valves 50a, 50b, and 50c as electrical signals.

The cross dichroic prism 60 is a light combining optical system for combining a color image, and has a first dichroic film 61 for reflecting the R light beam and a second dichroic film 62 for reflecting the B light beam disposed inside thereof forming an X-shape in a plan view. The cross dichroic prism 60 described above reflects the red light beam LR from the liquid crystal light valve 50a with the first dichroic film 61 to thereby emit it rightward in the traveling direction, makes the green light beam LG from the liquid crystal light valve 50b go straight via both of the dichroic films 61, 62 to thereby emit it therefrom, and reflects the blue light beam LB from the liquid crystal light valve 50c with the second dichroic film 62 to thereby emit it leftward in the traveling direction.

The projection optical system 70 acts as a projection lens to project the image light, which is combined by the cross dichroic prism 60, on a screen (not shown) as a color image.

In the projector 100 provided with the configuration described above, the illumination device 10 incorporates the light control device 80 to thereby perform dynamic control of the amount of illumination light by partially blocking the illumination light. In other words, the projector 100 is capable of accurately varying the amount of illumination light at desired timing by the opening and closing operations of the light control device 80, and by controlling the amount of illumination light in accordance with, for example, display scenes, a high dynamic contrast ratio can be obtained.

Figure 2:
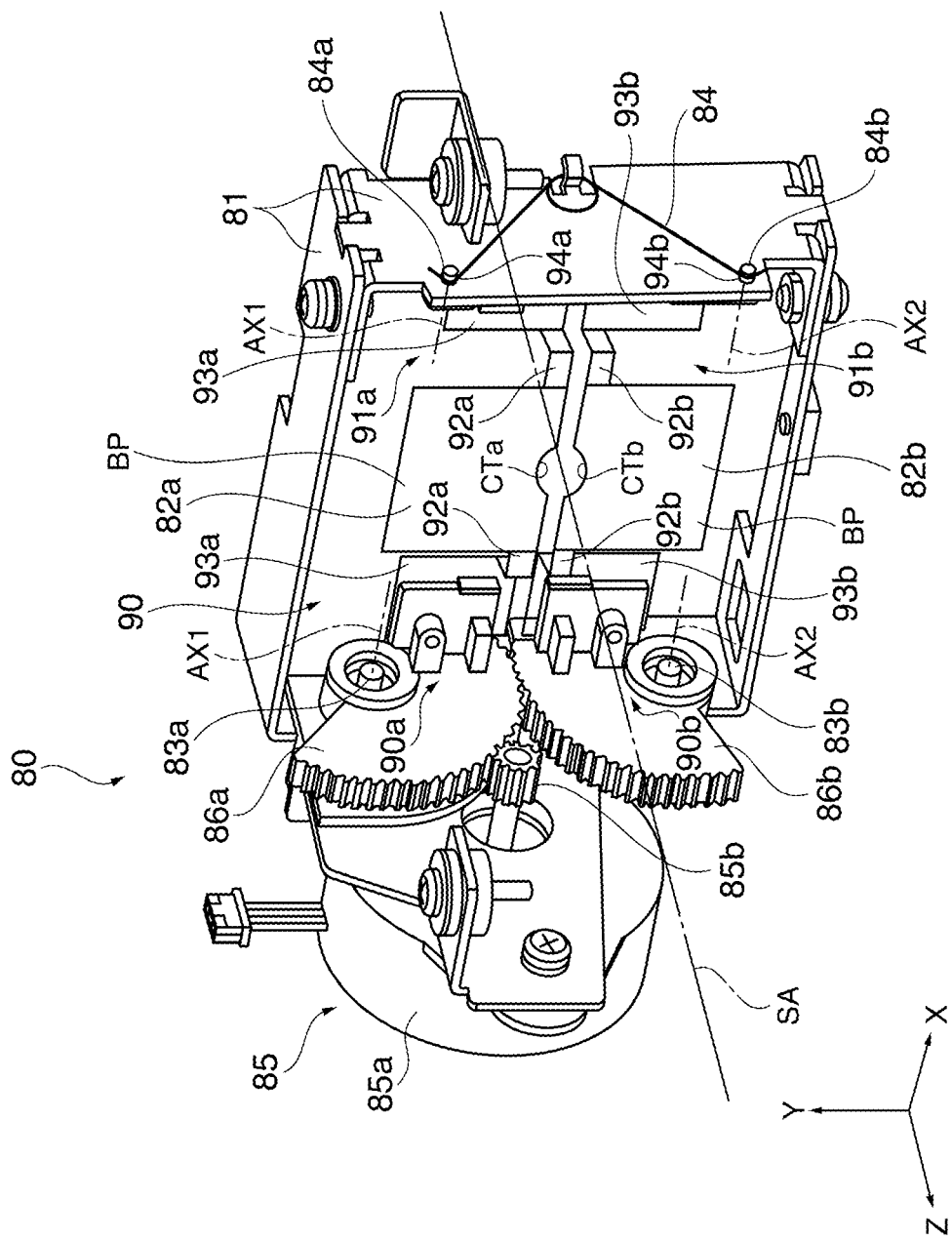
FIG. 2 is a perspective view showing a structure of a light control device.
Figure 3A:
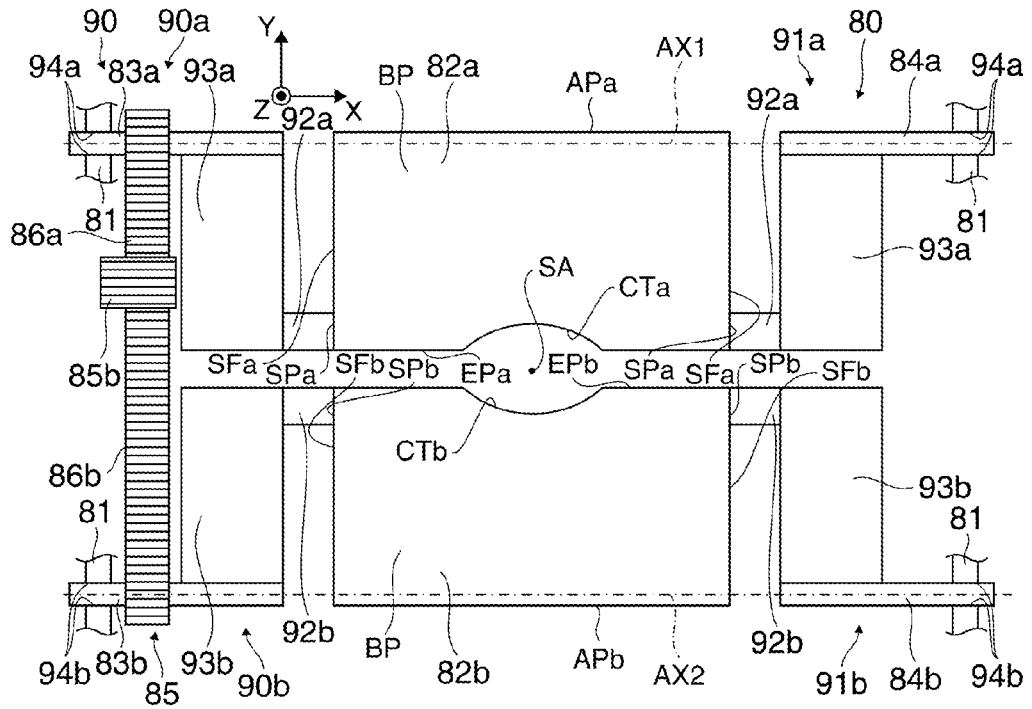
FIGS. 3A and 3B are schematic diagrams showing an example of a structure of a pair of light blocking members in the light control device.
Figure 3B:
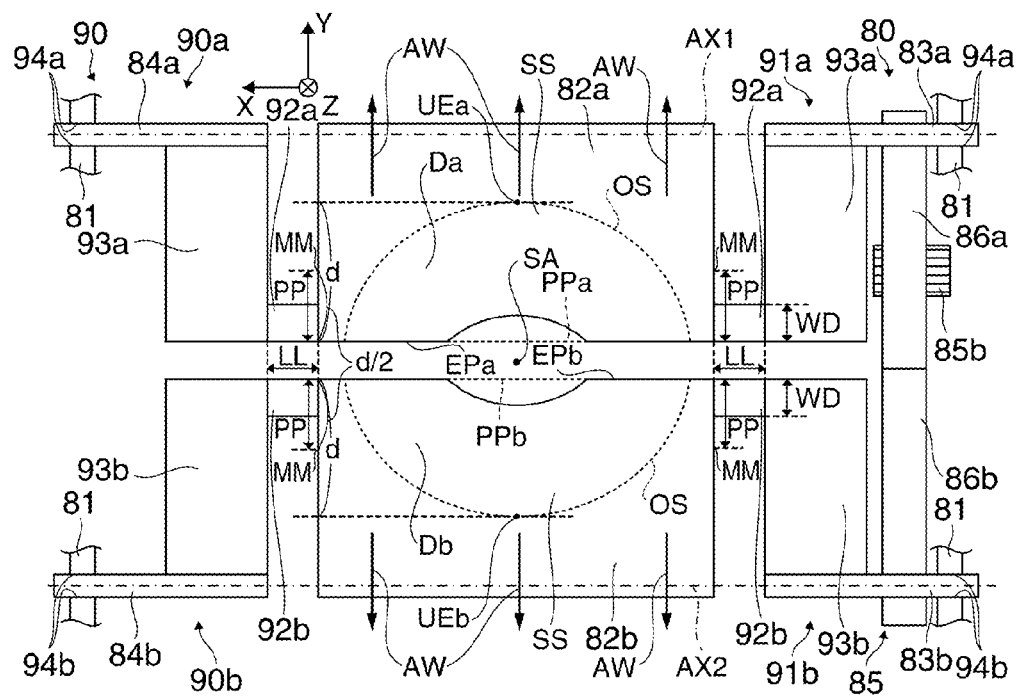
Figure 4:
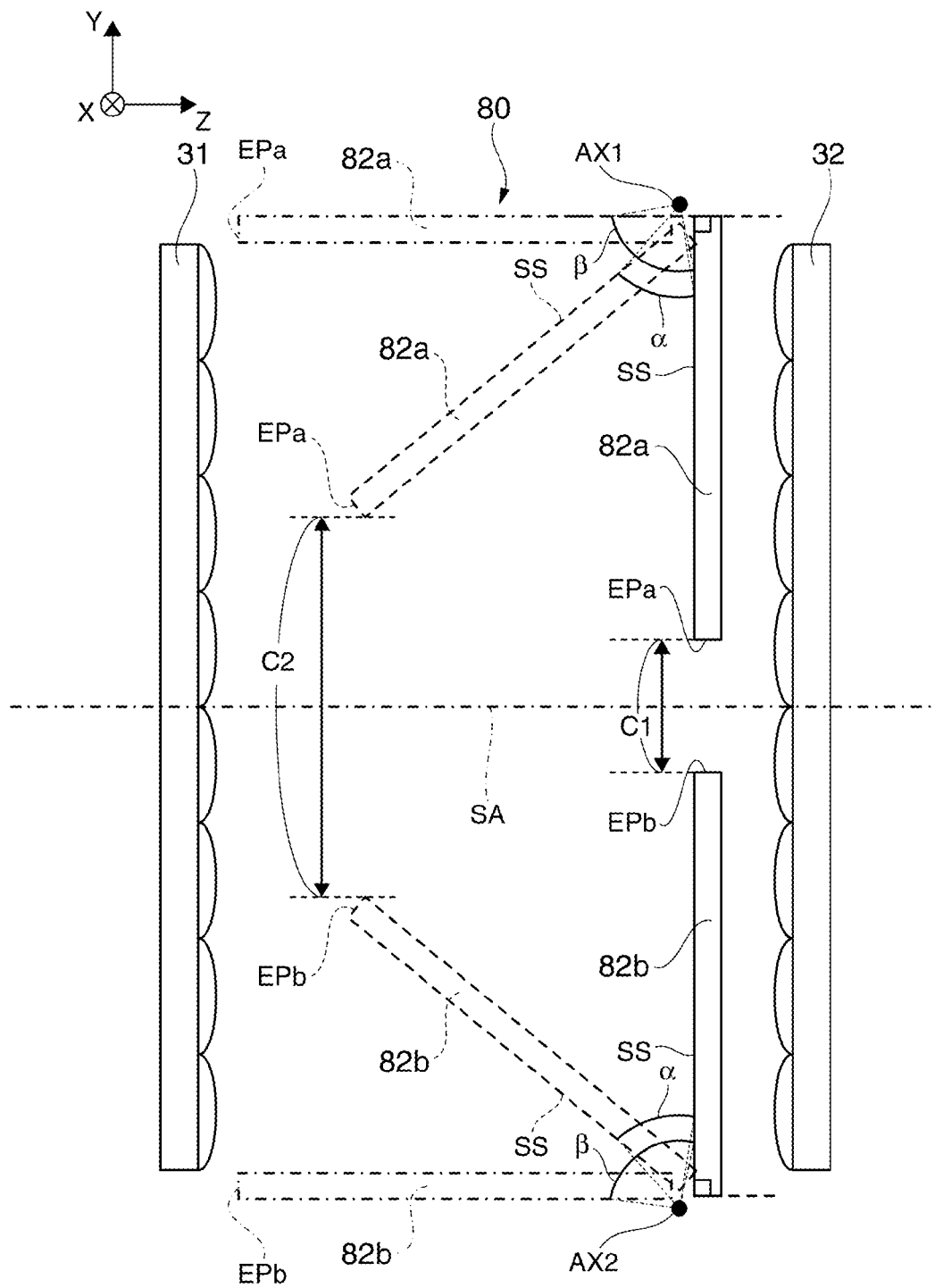
FIG. 4 is a schematic diagram showing an opening and closing operation of the pair of light blocking members.

FIG. 2 is a perspective view showing an overall structure of the light control device 80, and FIGS. 3A and 3B are diagrams schematically showing a principal part of the light control device 80. Here, FIGS. 2 and 3A show a state of the light control device 80 viewed from a downstream side along the light path, and FIG. 3B shows a state of the light control device 80 viewed from an upstream side along the light path. It should be noted that the light control device 80 has a pair of light blocking members 82a, 82b, and all of FIGS. 2, 3A, and 3B show a state (the maximum blocking state) in which the light control device 80 fully closes the light blocking members 82a, 82b to thereby block the illumination light as much as possible. As schematically shown in, for example, FIG. 4, the light control device 80 is for rotating the pair of light blocking members 82a, 82b respectively around a pair of center axes AX1, AX2 extending in an X direction on both sides of the system optical axis SA to increase and decrease the gap between the both light blocking members 82a, 82b, thereby performing the opening and closing operations of the light path taking the ±Y directions perpendicular to the system optical axis SA as the opening and closing direction.

Hereinafter, a principal configuration of the light control device 80 will be explained. Firstly, as shown in FIG. 2, the light control device 80 is provided with the first and second light blocking members 82a, 82b, a rotation section 90, and a drive device 85. It should be noted that the rotation section 90 and so on described above are supported by and fixed to a fixing member 81, and the fixing member 81 is attached to the case member 11 (see FIG. 1) acting as a light guide.

The first and second light blocking members 82a, 82b are a pair of members disposed symmetrically about the system optical axis SA, and extend in parallel to an X-Y plane perpendicular to the system optical axis SA in the maximum blocking state shown in the drawing. The light blocking members 82a, 82b are formed by processing a metal material such as stainless steel or aluminum, and each formed of a rectangular planar plate section BP. As shown in FIG. 3A, The first and second light blocking members 82a, 82b respectively have first and second edge portions EPa, EPb extending in the X direction on the side of the system optical axis SA as peripheral portions of the plate sections BP, namely the main bodies thereof. Further, the first and second light blocking members 82a, 82b respectively have edge portions APa, APb extending in the X direction on the opposite side to the edge portions EPa, EPb, namely on the side further from the system optical axis SA, as peripheral portions of the plate sections BP. Further, the first and second light blocking members 82a, 82b respectively have first and second side faces SFa, SFb extending in the Y direction as peripheral portions of the plate sections BP. It should be noted that the edge portions EPa, EPb are respectively provided with cutting sections CTa, CTb each having an arc-like curved shape. The cutting sections CTa, CTb having such shapes make it possible to keep the illuminance distribution of the light beam emitted in the opening and closing operations uniform, and to gently decrease and increase the amount of light.

The rotation section 90 functions as a drive section together with the drive device 85, and is composed of first through fourth rotation members 90a, 91a, 90b, and 91b. Among these members, the first and second rotation members 90a, 91a for the first light blocking member 82a are respectively provided with first support sections 92a, 92a, first arm sections 93a, 93a, rotational support shafts 83a, 84a, and bearing sections 94a, 94a. Further, the third and fourth rotation members 90b, 91b for the second light blocking member 82b are respectively provided with second support sections 92b, 92b, second arm sections 93b, 93b, rotational support shafts 83b, 84b, and bearing sections 94b, 94b. The first and second rotation members 90a, 91a are disposed so as to sandwich the first light blocking member 82a from the both sides to thereby support the first light blocking member 82a rotatably around the center axis AX1. Similarly, the third and fourth rotation members 90b, 91b are disposed so as to sandwich the second light blocking member 82b from the both sides to thereby support the second light blocking member 82b rotatably around the center axis AX2.

As shown in FIG. 2 or FIG. 3A, the drive device 85 is provided with a motor 85a, a transmission section 85b, and a pair of drive gears 86a, 86b, and applies power for driving the first and third rotation members 90a, 90b of the rotation section 90 to these rotation members.

Hereinafter the details of the rotation section 90 will be explained. In the first and second rotation members 90a, 91a among the constituents of the rotation section 90, the first support sections 92a, 92a extend respectively from side positions SPa, SPa of the edge portion EPa out of the side faces SFa, SFa of the first light blocking member 82a. The first support sections 92a, 92a are coupled respectively to tips of the arm sections 93a, 93a, thereby supporting the light blocking member 82a. Similarly, the second support sections 92b, 92b support the light blocking member 82b at side positions SPb, SPb of the edge portion EPb among the side faces SFb, SFb. Therefore, the sides of the edge portions EPa, EPb coming closest to the system optical axis SA out of the respective edge portions of the first and second light blocking members 82a, 82b become fixed ends respectively fixed by the support sections 92a, 92b. In contrast thereto, the end portions APa, APb located on the sides opposite to the edge portions EPa, EPb, respectively, out of the edge portions of the first and second light blocking members 82a, 82b become open free ends without support sections or the like.

Further, the first and second arm sections 93a, 93b of the rotation section 90 are coupled to the first and second light blocking members 82a, 82b at one ends via the support sections 92a, 92b as described above. Further, the first and second arm sections 93a, 93b are respectively connected to the pin-like rotational support shafts 83a, 84a, 83b, and 84b at the other ends thereof. The rotational support shafts 83a, 84a, 83b, and 84b are supported by the fixed member 81 in a rotatable state with the bearing sections 94a, 94b and a biasing member 84. Specifically, since there is provided a condition in which grooves (not shown) of the tips of the rotational support shafts 84a, 84b are engaged with the biasing member 84, the rotational support shafts 84a, 84b are in the state in which the rotational support shafts 84a, 84b are rotatable due to the bearing sections 94a, 94b, and are not detached therefrom at the same time. Further, the rotational support shafts 83a, 83b are fixed to the pair of drive gears 86a, 86b of the drive device 85, and are arranged to be rotatable in response to the action of the drive device 85. Thus, the arm sections 93a, 93b transmit the power from the drive device 85 to the light blocking members 82a, 82b via the first and second support sections 92a, 92b. It should be noted that the support sections 92a, 92b and the arm sections 93a, 93b of the rotation section can be formed integrally using a material (e.g., stainless steel or aluminum) the same as that of the light blocking members 82a, 82b.

Hereinafter, an operation of the light control device 80 will be explained with reference to FIG. 2. In the drive device 85, the rotation of the motor 85a is transmitted to the pair of drive gears 86a, 86b via the transmission section 85b. On this occasion, the drive gear 86a on the upper side and the drive gear 86b on the lower side rotate in the directions opposite to each other in sync with each other. Thus, the rotational support shafts 83a, 83b of the rotation section 90 respectively fixed to the pair of gears 86a, 86b rotate in sync with each other, and at the same time the pair of light blocking members 82a, 82b also rotate in sync with each other. Thus, it becomes possible to open and close the first and second light blocking members 82a, 82b in sync with each other in manner of a double door. On this occasion, a pair of light blocking members 82a, 82b change the state thereof in accordance with the forward or reverse rotation of the motor 85a. Specifically, in FIG. 4, for example, in accordance with the rotational operations of the light blocking members 82a, 82b around the center axes AX1, AX2, the light blocking members 82a, 82b take the maximum blocking state in which the light blocking members 82a, 82b become roughly parallel to the second lens array 32, and the edge portions EPa, EPb come closest to each other in the system optical axis SA direction as illustrated with the solid lines in the drawing, or take a fully opened state in which the light blocking members 82a, 82b rotate with a rotational angle β (approximately) 90° from the position in the maximum blocking state roughly parallel to the second lens array 32, and the edge portions EPa, EPb are located outside the light path of the illumination light beam without blocking the illumination light as illustrated with the dashed lines. Further, as illustrated with the broken lines, as an intermediate stage, the light blocking members 82a, 82b also take a state in which the light blocking members 82a, 82b rotate with the rotational angle α (α<β) from the position in the maximum blocking state roughly parallel to the second lens array 32, and the edge portions EPa, EPb are distant from the system optical axis SA to some extent so as to partially block the illumination light beam.

As described hereinabove, the first and second light blocking members 82a, 82b take the Y direction as the opening and closing direction, and move closer to and away from each other across the system optical axis SA in the edge portions EPa, EPb on the tip side to thereby control the amount of illumination light to be blocked. In other words, in the case of the maximum blocking state illustrated with the solid lines in FIG. 4, the light control device 80 transmits the illumination light through a small gap C1 between the first light blocking member 82a and the second light blocking member 82b in the Y direction. In contrast thereto, in the open state with the rotational angle α illustrated with the broken lines in FIG. 4, the light control device 80 transmits a larger amount of illumination light through a relatively wide gap C2 between the first light blocking member 82a and the second light blocking member 82b. In the light blocking in either of the states, the sizes of the gaps C1, C2 (the amount of blocking of the light viewed from the opposite side) are determined in accordance with the positions of the edge portions EPa, EPb.

Here, as shown in FIG. 3B, the side of the light source lamp unit 20 (see FIG. 1) of the plate-like light blocking members 82a, 82b, namely the irradiated surface SS with the illumination light facing the upstream side of the light path includes an outline OS formed by the outer edge of the illumination light beam input thereto and the domains Da, Db inside thereof as the irradiated area by the illumination light. These domains Da, Db include the edge portions EPa, EPb on the tip side of the both light blocking members 82a, 82b, and in particular, the edge portions EPa, EPb are located at positions the nearest to the system optical axis SA side, namely the center of the light beam, with respect to the opening and closing direction of the both light blocking members 82a, 82b. Therefore, the edge portions EPa, EPb take the lead in blocking the illumination light, and absorb much heat. In conjunction with the heat absorption described above, both of the light blocking members 82a, 82b expand as a whole. However, in both of the light blocking members 82a, 82b, the edge portions EPa, EPb are arranged to be the fixed ends respectively supported by the support sections 92a, 92b. The light blocking members 82a, 82b provided with the structure described above expand in the direction indicated by the arrows AW in FIG. 3B as a whole in particular in the maximum blocking state. In other words, the edge portions EPa, EPb closer to the system optical axis SA having an influence on the amount of light blocking stay the positions as they are with little substantial displacement, while the edge portions APa, APb further from the system optical axis SA having no influence on the amount of light blocking extend in a direction away from the system optical axis SA. As described above, since the positions of the edge portions EPa, EPb having an influence on the amount of light blocking become stable regardless of the heating state of both of the light blocking members 82a, 82b, it becomes possible to more accurately control the amount of light blocking in the maximum blocking state.

It should be noted that the maximum blocking state in which the edge portions EPa, EPb come the closest to the system optical axis SA and the influence of the heat derived from the light blocked becomes the most significant is explained as a reference. However, the expansion due to the heat in conjunction with the light blocking is caused not only in the maximum blocking state but also in any stages of the opening and closing operation of the light control device 80 except the case in which the light blocking is not performed such as a fully open state. In contrast thereto, in the light control device 80, it becomes possible to prevent the displacement of the edge portions EPa, EPb due to the thermal expansion or the thermal contraction of the light blocking members 82a, 82b in any stages in performing the light blocking. Therefore, the light control device 80 can make the edge portions EPa, EPb as the tips of the light blocking members 82a, 82b draw constant trajectories stably throughout the entire opening and closing operation, thus making it possible to more accurately control the amount of light blocking. According to the projector 100 using such a light control device 80, the variation in the dynamic contrast ratio can be reduced.

Further, in the embodiment described above, the support sections 92a, 92b as coupling sections for coupling the light blocking members 82a, 82b and the arm sections 93a, 93b to each other are arranged to be thinner than the light blocking members 82a, 82b or the arm sections 93a, 93b. In other words, in the support sections 92a, 92b, the size such as the width WD corresponding to the cross-sectional area for conducting the heat from the light blocking members 82a, 82b is controlled to be the value as small as possible while keeping the strength enough for supporting the light blocking members 82a, 82b, and the length LL of the heat channel is controlled to have a large value within the extent in which the strength of the light blocking members 82a, 82b is not degraded, and it can be spatially inserted at the arrangement position. In other words, the thermal resistance of the support sections 92a, 92b is arranged to have a sufficiently large value. Thus, the heat from the light blocking members 82a, 82b is prevented from being conducted to the arm sections 93a, 93b as much as possible, and the thermal expansion due to the blocking of the illumination light can be substantially prevented from being caused in the arm sections 93a, 93b. Therefore, the displacement of the edge portions EPa, EPb due to the expansion of the arm sections 93a, 93b is also prevented. It should be noted that the sizes of the arm sections 93a, 93b are arranged to be larger compared to the sizes of the support sections 92a, 92b as coupling sections. Thus, the arm sections 93a, 93b are arranged to have large thermal capacities, and therefore more difficult to expand.

Further, the light control device 80 described above is provided with the support sections 92a, 92b at the side positions SPa, SPb of the edge portions EPa, EPb out of the side faces SFa, SFb of the light blocking members 82a, 82b in order for avoiding the thermal displacement in the tip side of the light blocking members 82a, 82b. However, the support sections 92a, 92b can also be disposed at the positions other than the side positions SPa, SPb. More specifically, as shown in FIG. 3B, in the maximum blocking state, the support sections 92a, 92b can be disposed at some positions inside a predetermined range PP regarding the opening and closing direction (the Y direction) of the light blocking members 82a, 82b in some cases. Hereinafter, the predetermined range PP will be explained. Firstly, it is assumed that the upper limit and the lower limit in the Y direction, which is the opening and closing direction, are end points UEa, UEb, respectively, out of the outline OS, which is the portion the outer edge of the light beam to be blocked by the irradiated surface SS of the light blocking members 82a, 82b enters. Then, regarding the Y direction, the distance from the extended lines PPa, PPb of the edge portions EPa, EPb the closest to the system optical axis SA in the light blocking members 82a, 82b to the end points UEa, UEb is assumed to be the distance "d." In this case, the range located nearer to the system optical axis SA than the mid position MM on the side faces SFa, SFb with the distance to the edge portions EPa, EPb equal to a half (distance d/2) of the distance d corresponds to the predetermined range PP. By arranging the support sections 92a, 92b inside the predetermined range PP in accordance with the extent with which the expansion due to the blocking of the illumination light influences, it becomes possible to suppress the thermal displacement in the edge portions EPa, EPb due to the thermal expansion or the thermal contraction of the light blocking members 82a, 82b to be equal to or lower than a certain level, thus relatively accurate control of the amount of the light blocking becomes possible.

As described above, since the pair of light blocking members 82a, 82b are supported by the support sections 92a, 92b disposed at predetermined positions, the projector 100 according to the present embodiment becomes capable of reducing the influence of the heat generated from the illumination light thus blocked to thereby more accurately control the amount of light blocking, and of reducing the variation in the dynamic contrast ratio.

Modified Example of First Embodiment

Figure 5A:
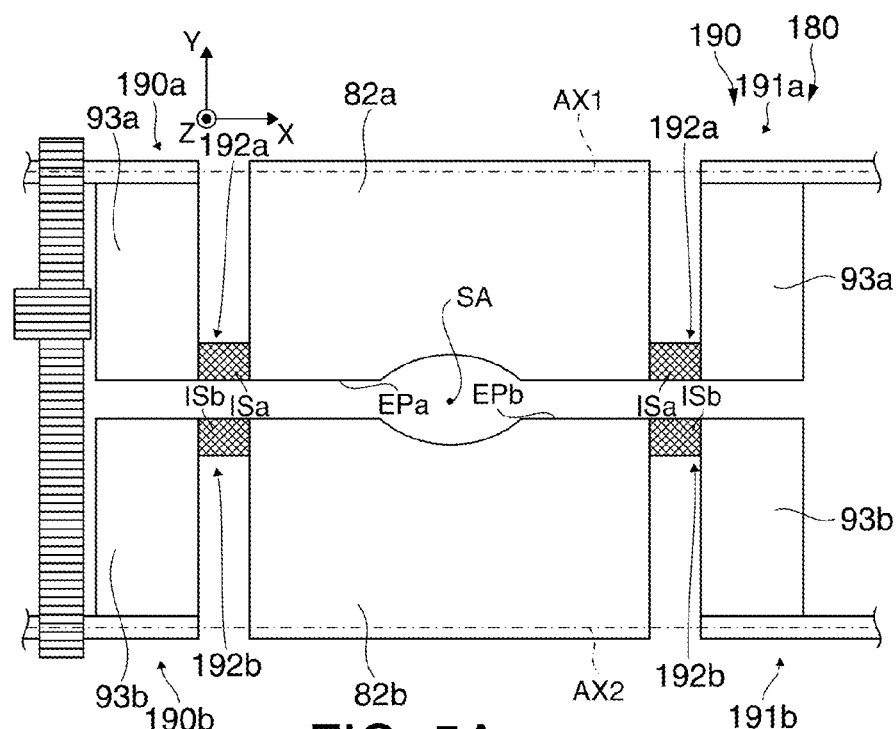
FIGS. 5A and 5B are schematic diagrams showing another example of the structure of the pair of light blocking members in the light control device.
Figure 5B:
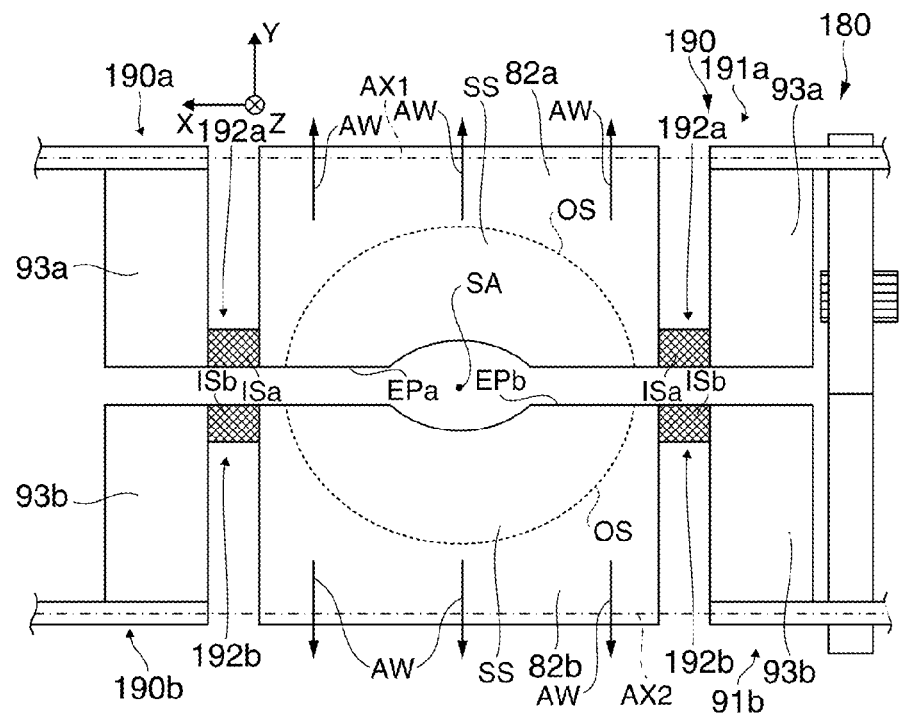

A light control device 180 shown in FIGS. 5A and 5B is a modified example of the light control device 80 shown in, for example, FIG. 3A, and is substantially the same as the light control device 80 except support sections 192a, 192b of first through fourth rotation members 190a, 191a, 190b, and 191b constituting the rotation section 190, and therefore, the explanation of the structure of other constituents will be omitted. The light control device 180 has a configuration of using heat insulating members ISa, ISb made of a heat insulating material such as ceramics as the coupling sections of the support sections 192a, 192b.

Figure 6A:
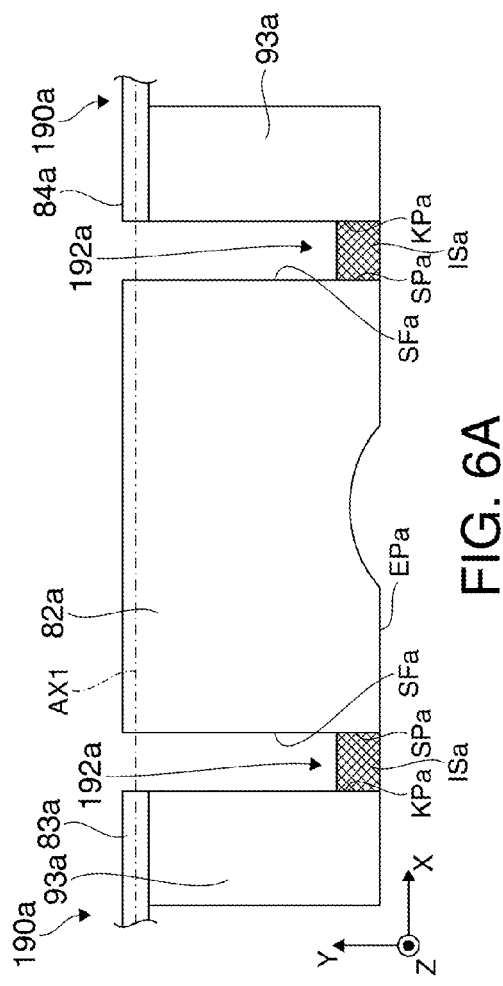
FIGS. 6A through 6C are schematic diagrams for explaining a structure according to a modified example of the structure of the pair of light blocking members.
Figure 6B:
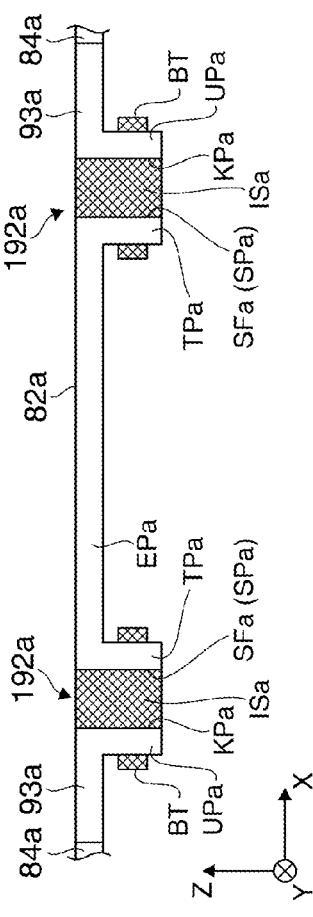
Figure 6C:
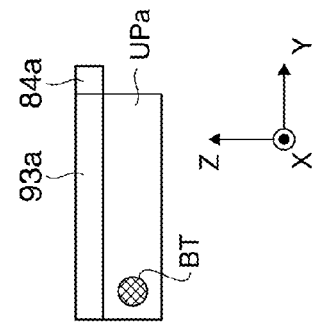

FIGS. 6A through 6C are schematic diagrams for explaining a detailed structure of the light control device 180 shown in, for example, FIG. 5A. In FIGS. 6A through 6C, in view of the symmetrical property of the pair of light blocking members 82a, 82b, the structure of only the light blocking member 82a will be explained, and the structure of the light blocking member 82b, which is substantially the same, will be omitted from the explanation. In the light control device 180, the support sections 192a, 192a of the first and the second rotation members 190a, 191a have the heat insulating members ISa, ISa made of a material having a relatively large thermal resistance such as ceramics, and pins BT, BT similarly made of, for example, ceramics. Further, as shown in FIG. 6B, the light blocking member 82a has ribs TPa, TPa formed by bending the side end sections to have an L-shape using a folding process, and the side surfaces of the ribs TPa, TPa form the first side faces SFa, SFa. Similarly, the first arm section 93a also has ribs UPa, UPa formed by bending the side end sections to have an L-shape, and the side surfaces of the ribs UPa, UPa form the side sections KPa, KPa.

In the first rotation member 190a, the heat insulating member ISa is disposed so as to be sandwiched between the side position SPa out of the side face SFa of the light blocking member 82a and the side section KPa of the first arm section 93a. The pin BT penetrates the light blocking member 82a, the heat insulating member ISa, and the first arm section 93a arranged in a line in the X direction, and connects these components to each other. Similarly, in the second rotation member 191a, the pin BT connects the light blocking member 82a, the heat insulating member ISa, and the first arm section 93a to each other. In such a manner as described above, the support sections 192a, 192a have the heat insulating members ISa, ISb as the coupling sections to support the light blocking member 82a.

In the case of the present modified example, the heat insulating members ISa, ISb made of ceramics or the like couples the light blocking members 82a, 82b and the arm sections 93a, 93b to each other in the support sections 192a, 192b. Thus, since it is possible to increase the thermal resistance of the support sections 192a, 192b, thermal conduction from the light blocking members 82a, 82b to the first and second arm sections 93a, 93b can further be reduced. Therefore, the displacement of the support sections 192a, 192b, namely the displacement of the edge portions EPa, EPb, due to the displacement of the arm sections 93a, 93b can be avoided.

Another Modified Example of First Embodiment

FIGS. 7A through 7D are schematic diagrams for explaining the structure of another modified example of the light control device 180. It should be noted that also in FIGS. 7A through 7D the structure of the side of only the light blocking member 82a is shown, and the side of the light blocking member 82b is omitted. In the light control device 180, the heat insulating members ISa, ISa as the support sections 192a, 192a have the shape capable of being inserted and fixed by fitting the shapes of the ribs TPa, UPa formed by bending to have an L-shape as shown in FIGS. 7B and 7D. Thus the heat insulating members ISa, ISa connect the light blocking member 82a and the first arm section 93a to each other. Therefore, in the case of the present modified example, the support sections 192a, 192a couple the light blocking member 82a and the first arm section 93a to each other only with the heat insulating members ISa, ISa without using, for example, pins.

Second Embodiment

Hereinafter, a projector according to a second embodiment of the invention will be explained with reference to FIGS. 8A and 8B. It should be noted that since the overall configuration of the projector according to the present embodiment is substantially the same as that of the projector 100 shown in FIG. 1, and is different therefrom only in that the configuration of the light blocking members and the peripheral mechanism inside the light control device, the explanation and the illustration of the second embodiment except the light blocking members and the peripheral mechanism thereof will be omitted.

As shown in FIGS. 8A and 8B, the light control device 280 in the projector according to the present embodiment has a slide section 290 and the drive device 300 as the drive section for opening and closing the light blocking members 82a, 82b. The slide section 290 is provided with first and second arm sections 293a, 293b, support sections 292a, 292b, and the guide sections 303, 304. The first and second arm sections 293a, 293b are coupled to the first and second light blocking members 282a, 282b via the support sections 292a 292b, respectively. The guide sections 303, 304 determine the direction and the range of the slide movement of the arm sections 293a, 293b and the light blocking members 282a, 282b. The drive device 300 is provided with a coupling shaft section 301, a rotational drive section 302, and hinges HG. The rotational drive section 302 rotationally drives the coupling shaft section 301. The hinges HG couple the arm sections 293a, 293b and the coupling shaft section 301 to each other in a rotatable manner. Thus, the coupling shaft section 301 operates the arm sections 293a, 293b.

Hereinafter, details of the operation of the light control device 280 will be explained. Firstly, the coupling shaft section 301 of the drive device 300 is rotationally operated in accordance with the forward or reverse rotation of the rotational drive section 302 disposed at the center of the coupling shaft section 301. In conjunction therewith, the arm sections 293a, 293b rotatably coupled to the coupling shaft section 301 via the hinges HG are translated in the ±Y directions along the guide section 303. Therefore, when the arm section 293a moves in the −Y direction as shown in FIG. 8A, the first light blocking member 282a also moves in the −Y direction along the guide section 304 in conjunction therewith. Further, on this occasion, the arm section 293b moves in the +Y direction, and the second light blocking member 282b also moves in the +Y direction along the guide section 304 in conjunction therewith. As a result, the light blocking members 282a, 282b become in the blocking state. On the other hand, in the state in which the arm section 293a moves in the +Y direction as shown in FIG. 8B, for example, the arm section 293b becomes in the state of moving in the −Y direction, and as a result, the light blocking members 282a, 282b become in an open state. Also in the case of using the light control device 280 as in the present embodiment, by providing the support sections 292a, 292b in the side positions SPa, SPb of the edge portions EPa, EPb on the side of the system optical axis SA, it becomes possible to avoid the thermal displacement of the edge portions EPa, EPb due to the thermal expansion or thermal contraction of the light blocking members 282a, 282b to thereby more accurately control the amount of light blocking.

It should be noted that the invention is not limited to the embodiments described above, but can be put into practice in various forms within the scope or the spirit of the invention, and the following modifications, for example, are also possible.

Firstly, although in the embodiments described above the light control devices 80, 180, and 280 are disposed between the first and second lens arrays 31, 32, the invention is not limited thereto. The light control devices 80, 180, and 280 can be disposed at either one of the positions between the first lens array 31 and the overlapping lens 35. In this case, the light beams split by the first lens array and before being overlapped can arbitrarily be blocked.

Further, although in each of the embodiments the light control devices 80, 180, and 280 perform the opening and closing operation due to the drive devices 85, 300, the way of rotational or sliding movement is not limited thereto, but various methods can be applied such that the opening and closing operation is performed using the expansion and contraction of a spring.

Further, although the cutting CTa is provided to the light blocking member 82a, the light blocking member without the cutting can also be adopted. Further, various types of light blocking members besides the above can also be adopted, and for example, those having a double blade structure including a first blade provided with the cutting as described above and a second blade capable of covering a part or the entire of the cutting in accordance with the degree of closing or opening.

Further, although in the embodiment described above a high-pressure mercury lamp is used as the light emitting tube 22a used for the light source lamp unit 21, a metal halide lamp or the like can also be used.

Further, although in the embodiments described above, the polarization conversion member 34 for converting the light beam from the light source lamp unit or the like into a polarized light beam with a specified direction is used, the invention can also be applied to illumination devices which do not use such a polarization conversion member 34.

Further, although in the embodiments described above there is explained the example of the case in which the invention is applied to the projector provided with the transmissive liquid crystal light valves 50a, 50b, and 50c, the invention can also be applied to projectors provided with reflective liquid crystal light valves. It should be noted here that "transmissive" denotes that the liquid crystal light valve is a type of transmitting a light beam, and "reflective" denotes that the liquid crystal light valve is a type of reflecting a light beam.

Further, as the projector, a front projector performing image projection from a direction of observing the projection screen and a rear projector performing image projection from the opposite direction of observing the projection screen can be cited, and the configuration of the projector shown in FIG. 1 can be applied to the both types of projectors.

Further, although in the embodiments described above, the light modulation of the respective colored light beams is performed using the color separation light guide optical system 40, liquid crystal light valves 50a, 50b, and 50c, and so on, it is also possible to use, for example, a combination of a color wheel illuminated by the illumination device and the device (light modulation section) composed of the pixels of micromirrors, and irradiated with the transmitted light from the color wheel instead of the above components, thereby performing color light modulation and combination.

The entire disclosure of Japanese Patent Application No. 2009-236004, filed Oct. 13, 2009 is expressly incorporated by reference herein.

What is claimed is:

1. A projector comprising:
an illumination optical system including
a light source that emits a light beam having a center axis coinciding with a system optical axis,
first and second light blocking members adapted to partially block the light beam from the light source, and
a drive section adapted to make the first and second light blocking members perform an opening and closing operation;
a light modulation device illuminated by an illumination light beam from the illumination optical system; and
a projection optical system adapted to project the light beam modulated through the light modulation device,
wherein:
the drive section includes first and second support sections adapted to respectively support the first and second light blocking members,
when the corresponding first and second light blocking members are located at a maximum blocking state, with respect to an opening and closing direction of the first and second light blocking members perpendicular to the system optical axis, the first and second support sections are connected to the first and second light blocking members at predetermined positions that are closer to optical-axis-side edge portions of each of the first and second blocking members than midpoints between the optical-axis-side edge portions of the first and second light blocking members and outer edges of the light beam to be blocked, and
when the corresponding first and second light blocking members are located at a maximum blocking state, with respect to the opening and closing direction of the first and second light blocking members perpendicular to the system optical axis, the optical-axis-side edge portion of the first light blocking member is a portion of the first light blocking member that is disposed closest to the second light blocking member and the optical-axis-side portion of the second light blocking member is a portion of the second light blocking member that is disposed closest to the first light blocking member.

2. The projector according to claim 1, wherein
with respect to the opening and closing direction of the first and second light blocking members, edge portions of the first and second light blocking members on a side further from the system optical axis are opened.

3. The projector according to claim 1, wherein
the first and second support sections support the first and second light blocking members at side positions of the edge portions on the system optical axis side.

4. The projector according to claim 1, wherein
the drive section includes rotational support shafts adapted to rotate the first and second light blocking members via the first and second support sections to thereby make the first and second light blocking members perform an opening and closing operation.

5. The projector according to claim 1, wherein
the drive section includes first and second arm sections coupled to the first and second light blocking members via the first and second support sections to thereby transmit power, respectively.

6. The projector according to claim 5, wherein
the first and second support sections include coupling sections each made of a heat insulating material, and disposed between the first and second light blocking members and the first and second arm sections, respectively.

7. The projector according to claim 1, wherein
the first and second light blocking members are disposed symmetrically about the system optical axis as an axis of symmetry as a pair of light blocking members, and
the drive section drives the pair of light blocking members in sync with each other.

8. The projector according to claim 1, wherein
the illumination optical system includes
first and second lens arrays adapted to equalize the light beam from the light source, and
an overlapping lens adapted to overlap the illumination light having passed through the first and second lens arrays, and
the first and second light blocking members are disposed between the first lens array and the overlapping lens.

9. The projector according to claim 1, wherein the first and second support section are connected to the first and second light blocking members directly adjacent the optical-axis-side edge portion of each of the first and second light blocking members.

10. The projector according to claim 1, wherein the optical-axis-side edge portions of the first and second light blocking members face each other when the first and second light blocking members are located at the maximum blocking state.

* * * * *